United States Patent
Cozzo et al.

(10) Patent No.: US 11,659,600 B2
(45) Date of Patent: May 23, 2023

(54) METHOD AND APPARATUS FOR RANDOM ACCESS PROCEDURE

(71) Applicant: Samsung Electronics Co., Ltd., Suwon-si (KR)

(72) Inventors: Carmela Cozzo, San Diego, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/249,206

(22) Filed: Feb. 23, 2021

(65) Prior Publication Data

US 2021/0274554 A1 Sep. 2, 2021

Related U.S. Application Data

(60) Provisional application No. 63/091,083, filed on Oct. 13, 2020, provisional application No. 62/982,997, filed on Feb. 28, 2020.

(51) Int. Cl.
*H04W 74/08* (2009.01)
*H04L 1/16* (2006.01)
*H04L 1/1607* (2023.01)

(52) U.S. Cl.
CPC ....... *H04W 74/0833* (2013.01); *H04L 1/1614* (2013.01)

(58) Field of Classification Search
None
See application file for complete search history.

(56) References Cited

U.S. PATENT DOCUMENTS

| 11,252,714 | B1* | 2/2022 | Babaei | H04L 5/0094 |
| 11,310,836 | B2* | 4/2022 | MolavianJazi | H04L 5/0053 |
| 11,399,367 | B2* | 7/2022 | Babaei | H04W 72/0446 |
| 2014/0098761 | A1 | 4/2014 | Lee et al. | |
| 2019/0053029 | A1* | 2/2019 | Agiwal | H04W 76/27 |
| 2019/0215130 | A1* | 7/2019 | Aiba | H04L 5/0057 |
| 2019/0215871 | A1* | 7/2019 | Aiba | H04W 76/27 |
| 2019/0254030 | A1* | 8/2019 | Wu | H04W 48/12 |

(Continued)

FOREIGN PATENT DOCUMENTS

| EP | 3609277 A1 | 2/2020 |
| KR | 10-2019-0111767 A | 10/2019 |
| WO | 2019195445 A1 | 10/2019 |

OTHER PUBLICATIONS

International Search Report and Written Opinion of the International Searching Authority dated Jun. 15, 2021, in connection with International Application No. PCT/KR2021/002461, 7 pages.

(Continued)

*Primary Examiner* — Faiyazkhan Ghafoerkhan

(57) ABSTRACT

Methods and apparatuses for random access procedures in a wireless communication system. A method for operating a user equipment (UE) includes receiving a system information block (SIB) in a downlink bandwidth (DL) part (BWP). The DL BWP is linked to a first uplink (UL) BWP. The SIB includes an indication for one or more UL BWPs. The method further includes transmitting a physical random access channel (PRACH) in a second UL BWP from the one or more UL BWPs. The second UL BWP is different than the first UL BWP.

20 Claims, 8 Drawing Sheets

(56) References Cited

U.S. PATENT DOCUMENTS

| | | | |
|---|---|---|---|
| 2019/0254073 A1* | 8/2019 | Sheng | H04L 1/0063 |
| 2019/0349969 A1* | 11/2019 | Chakraborty | H04W 56/0015 |
| 2019/0357261 A1* | 11/2019 | Cirik | H04W 24/08 |
| 2020/0137718 A1* | 4/2020 | Agiwal | H04W 72/042 |
| 2020/0266950 A1* | 8/2020 | Hwang | H04L 5/0051 |
| 2020/0351851 A1* | 11/2020 | Aiba | H04W 72/042 |
| 2020/0382264 A1* | 12/2020 | Aiba | H04L 5/0094 |
| 2020/0396760 A1* | 12/2020 | Yi | H04L 1/1864 |
| 2021/0051731 A1* | 2/2021 | Lee | H04W 74/0833 |
| 2021/0058971 A1* | 2/2021 | MolavianJazi | H04L 1/189 |
| 2021/0076384 A1* | 3/2021 | MolavianJazi | H04L 5/0053 |
| 2021/0100041 A1* | 4/2021 | Jung | H04W 74/0833 |
| 2021/0119697 A1* | 4/2021 | Wang | H04B 7/18543 |
| 2021/0160879 A1* | 5/2021 | Lin | H04L 1/1854 |
| 2021/0195654 A1* | 6/2021 | Lei | H04L 1/189 |
| 2021/0211256 A1* | 7/2021 | Hwang | H04L 5/0051 |
| 2021/0274554 A1* | 9/2021 | Cozzo | H04W 48/12 |
| 2021/0282143 A1* | 9/2021 | Lee | H04W 52/281 |
| 2021/0288776 A1* | 9/2021 | Hwang | H04L 5/0053 |
| 2021/0336688 A1* | 10/2021 | Lee | H04W 48/16 |
| 2021/0360660 A1* | 11/2021 | Cozzo | H04L 1/1896 |
| 2021/0410186 A1* | 12/2021 | Hajir | H04W 74/0816 |
| 2022/0159746 A1* | 5/2022 | Ko | H04L 5/0053 |
| 2022/0173856 A1* | 6/2022 | Ko | H04L 27/2613 |
| 2022/0256612 A1* | 8/2022 | MolavianJazi | H04W 74/0833 |
| 2022/0287103 A1* | 9/2022 | Cozzo | H04W 74/0833 |

OTHER PUBLICATIONS

Motorola Mobility et al., "Discussion for draft CR on the number of closed-loop PC processes," R1-1902841, 3GPP TSG RAN WG1 #96, Spokane, WA, USA, Feb. 25-Mar. 1, 2019, 5 pages.

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and channel coding (Release 16)", 3GPP TS 38.212 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"5G; NR; Medium Access Control (MAC) protocol specification (3GPP TS 38.321 version 15.8.0 Release 15)", ETSI TS 138 321 V15.8.0, Jan. 2020, 80 pages.

"5G; NR; Radio Resource Control (RRC); Protocol specification (3GPP TS 38.331 version 15.8.0 Release 15)", ETSI TS 138 331 V15.8.0, Jan. 2020, 527 pages.

Extended European Search Report dated Jan. 4, 2023 regarding Application No. 21761216.7, 12 pages.

ZTE Corporation et al.: "CR on SI request procedure in TS38.331", 3GPP Draft; R2-1814029, 3RD Generation Partnership Project (3GPP), RAN WG2, Sep. 2018, XP051523490, 9 pages.

* cited by examiner

METHOD AND APPARATUS FOR RANDOM ACCESS PROCEDURE

CROSS-REFERENCE TO RELATED APPLICATIONS AND CLAIM OF PRIORITY

The present application claims priority to U.S. Provisional Patent Application No. 62/982,997, filed on Feb. 28, 2020; and U.S. Provisional Patent Application No. 63/091,083, filed on Oct. 13, 2020. The content of the above-identified patent document is incorporated herein by reference.

TECHNICAL FIELD

The present disclosure relates generally to wireless communication systems and, more specifically, the present disclosure relates to a random access procedure.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to random access procedures.

In one embodiment, a user equipment (UE) is provided. The UE includes a processor and a transceiver operably connected to the processor. The transceiver is configured to receive a system information block (SIB) in a downlink (DL) bandwidth part (BWP). The DL BWP is linked to a first uplink (UL) BWP. The SIB includes an indication for one or more UL BWPs. The transceiver is further configured to transmit a physical random access channel (PRACH) in a second UL BWP from the one or more UL BWPs. The second UL BWP is different than the first UL BWP.

In another embodiment, a base station (BS) is provided. The BS includes a processor a transceiver operably connected to the processor. The transceiver is configured to transmit a SIB in a DL BWP. The DL BWP is linked to a first UL BWP. The SIB includes an indication for one or more UL BWPs. The transceiver is further configured to receive a PRACH in a second UL BWP from the one or more UL BWPs. The second UL BWP is different than the first UL BWP.

In yet another embodiment, a method for operating a UE is provided. The method includes receiving a SIB in a DL BWP. The DL BWP is linked to a first UL BWP. The SIB includes an indication for one or more UL BWPs. The method further includes transmitting a PRACH in a second UL BWP from the one or more UL BWPs. The second UL BWP is different than the first UL BWP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.0.0, "NR; Physical channels and modulation"; 3GPP TS 38.212 v16.0.0, "NR; Multiplexing and Channel coding"; 3GPP TS 38.213 v16.0.0, "NR; Physical Layer Procedures for Control"; 3GPP TS 38.214 v16.0.0, "NR; Physical Layer Procedures for Data"; 3GPP TS 38.321 v15.8.0, "NR; Medium Access Control (MAC) protocol specification"; and 3GPP TS 38.331 v15.8.0, "NR; Radio Resource Control (RRC) Protocol Specification."

Figure 1:
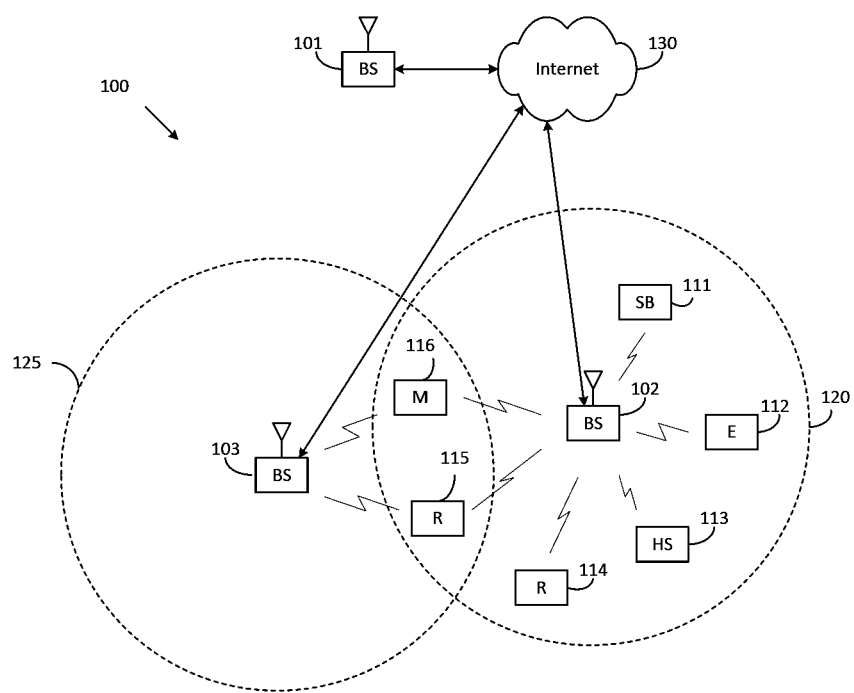
FIG. 1 illustrates an example wireless network according to embodiments of the present disclosure.
Figure 2:
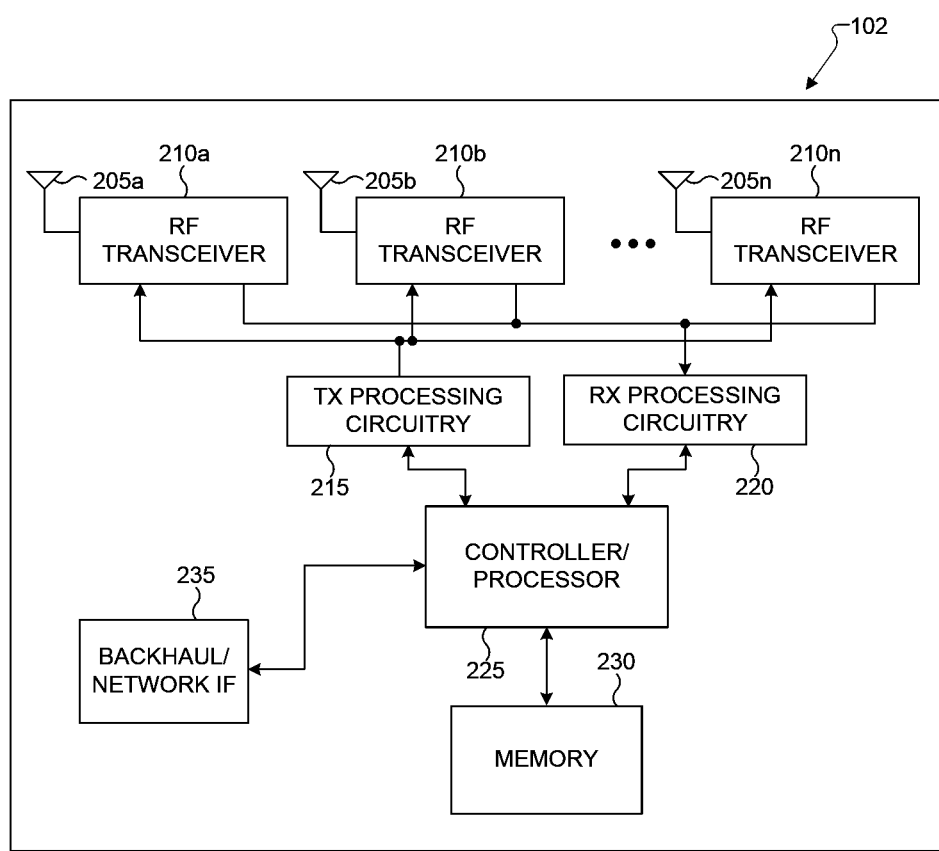
FIG. 2 illustrates an example gNB according to embodiments of the present disclosure.
Figure 3:
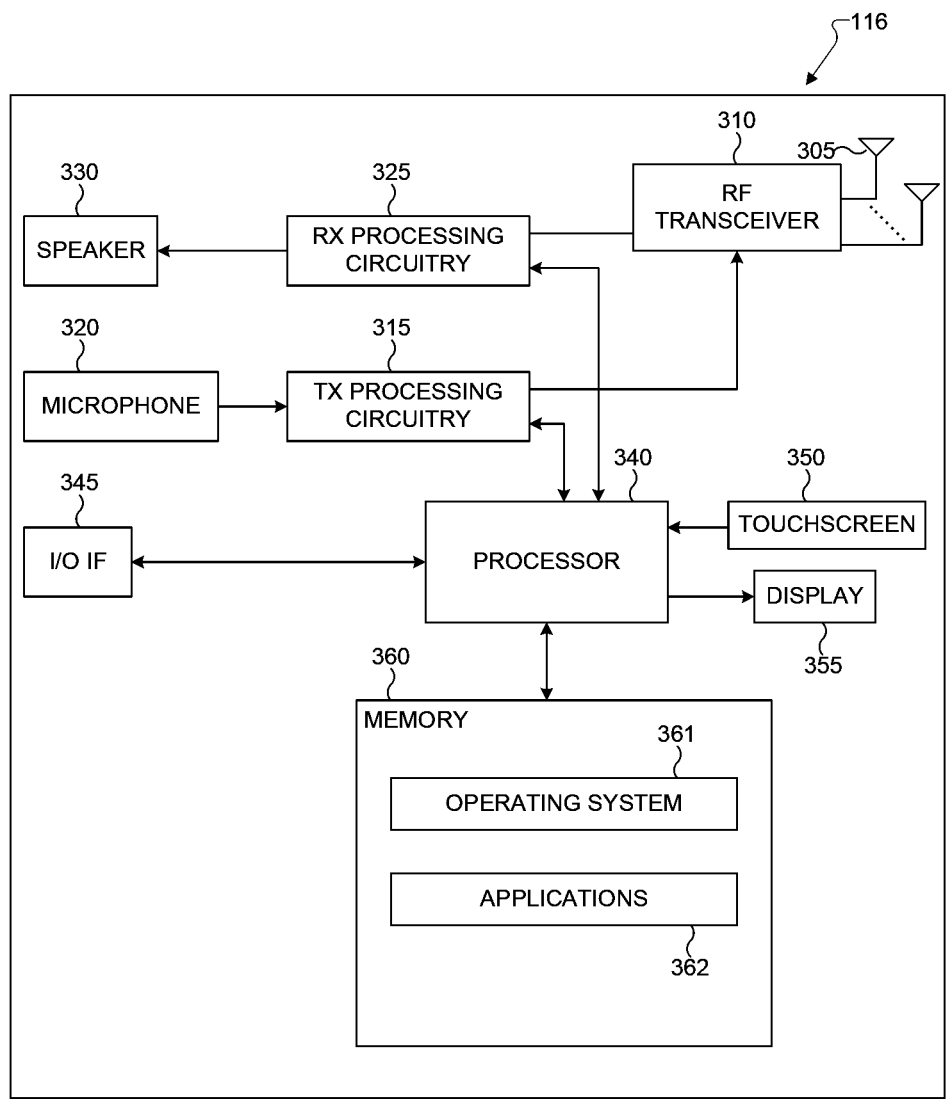
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), LTE-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for random access procedures according to embodiments of the present disclosure. In certain embodiments, and one or more of the gNBs 101-103 includes circuitry, programing, or a combination thereof, the random access procedures.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for random access procedures. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
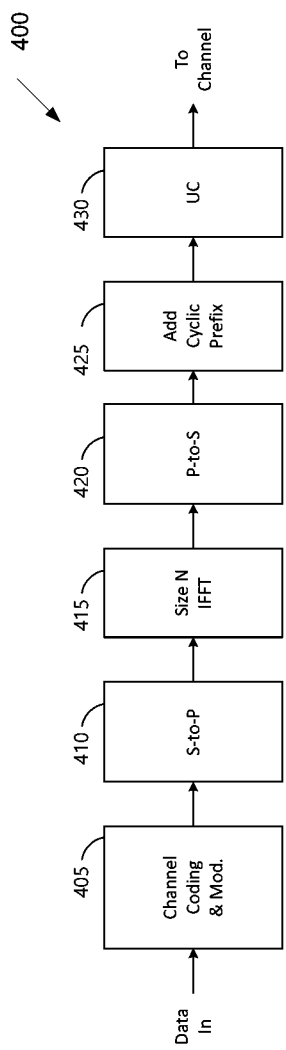
FIGS. 4 and 5 illustrate example wireless transmit and receive paths according to this disclosure.
Figure 5:
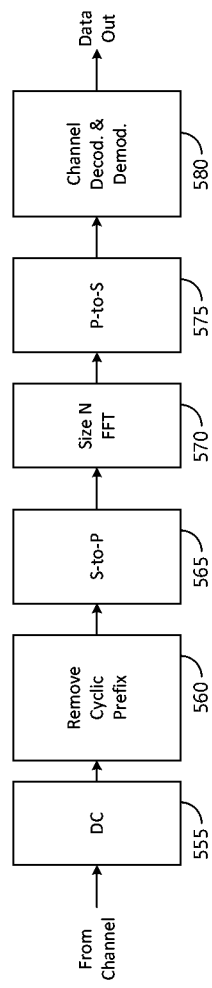

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the random access procedures as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The variety of applications for 5G and beyond requires different target values for the different capabilities such as peak data rate, capacity, latency, mobility, connection density, network energy efficiency, etc. The main usage scenarios can be categorized as enhanced mobile broadband (eMBB), ultra-reliable low latency communications (URLLC) and massive machine type communications (mMTC). The eMBB scenario is characterized by high data rates, high user density and wide-area coverage. The URLLC scenario is characterized by low latency, high reliability and high availability. The mMTC scenario is characterized by high connection density, low power consumption and low complexity. To satisfy the requirements of the various applications and use cases, devices targeted for different applications or use cases have different characteristics. Hence there will be different types of devices.

As an example, devices belonging to the broad category of mMTC have requirements on latency/data rate/battery life/connection density in order to support specific IoT (Internet of Things) use cases in vertical industries. One type of devices, which may be called "RedCap UEs," may have reduced capabilities respect to devices for eMBB use cases while satisfying low power consumption and low cost requirements. The RedCap UEs have the capabilities to support the required latency, data rate, battery life, density of devices for a certain use case or application and operate in the same network with other types of devices, such as eMBB and/or URLLC devices.

Examples of use cases include industrial wireless sensors (IWS), video surveillance, and wearables. Given the diverse requirements associated with the diverse use cases, "RedCap UE" terminology in this disclosure is intended as a broad term to indicate UEs with certain characteristics/capabilities/features to fulfill the requirements of one or more use cases. Such characteristics include, but are not limited to, cost, complexity, capabilities such as bandwidth, number of Rx and/or Tx RF chain, power class. An exemplary case is a type of UE with reduced capabilities respect to UE group/category as defined by 3GPP 5G NR Rel-15. Such a UE or UE group may be recognized as a UE category (or multiple UE categories) satisfying certain radio/service requirements.

In a single cell, the downlink carrier can be associated with two uplink carriers. This is known as the supplementary uplink (SUL) cell. One UL carrier, the non-SUL (NUL) or normal carrier, is located in the normal FDD or TDD band, and the SUL carrier is typically located in a lower frequency band. The decoupling of uplink and downlink has the advantage of enhancing cell coverage, and the lower frequency carrier allows UEs at the cell-edge or in general UEs experiencing a high path loss to access the network with the lower uplink carrier and provide higher data rates respect to accessing the network with the higher uplink carrier. A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE may not transmit PUSCH or PUCCH outside an active bandwidth part. For an active cell, the UE may not transmit SRS outside an active bandwidth part.

An SUL cell can benefit deployments with different types of UEs with different data rate, latency, and bandwidth requirements, and with unbalanced traffic between uplink and downlink. For example, devices for video surveillance or industrial wireless sensors, here called reduced capability-UEs (RedCap UEs) to differentiate them from Rel-15/16 eMBB and URLLC NR UEs, generate a large amount of traffic in the uplink. The flexibility offered by the SUL cell is beneficial for extending the cell coverage and allowing cell-edge UEs (UEs experiencing high path loss) to access the network through the lower frequency carrier and cell-center UEs to access through the higher frequency carrier, but also for distributing the load within the two uplink carriers depending on type of service, UE bandwidth/latency/data rate requirements, mobility, etc. The non-SUL uplink carrier has typically a larger bandwidth than the SUL carrier and separation of the traffic between SUL and non-SUL carriers can optimize the overall cell coverage. For example, in good channel conditions on the non-SUL carrier, uplink traffic with high data rates can be scheduled on the non-SUL carrier and RedCap UEs requiring a smaller bandwidth can be scheduled on the SUL carrier. In bad channel conditions, the traffic can be redistributed differently in order to benefit of the added coverage of the SUL carrier.

In the cell selection process, the UE acquires the SIB1 which indicates whether the cell is an SUL cell. If the UE supports the SUL operation, the UE selects the uplink carrier to initiate the random access based on DL measurements. An RSRP threshold rsrp-ThresholdSSB-SUL for the selection between the NUL carrier and the SUL carrier is configured to the UE: if the RSRP of the downlink pathloss reference is less than rsrp-ThresholdSSB-SUL, the UE selects the SUL carrier for performing Random Access procedure, and sets the PCMAX to PCMAX,f,c of the SUL carrier; else the UE selects the NUL carrier for performing Random Access procedure, and sets the PCMAX to PCMAX,f,c of the NUL carrier. The value of the threshold rsrp-ThresholdSSB-SUL determines the carrier where the RedCap UE initiates the random access and where the uplink data transmission is done after the random access procedure is concluded successfully. The network can switch the uplink transmission to a different uplink carrier when the UE is in CONNECTED mode.

A random access (RA) procedure can be initiated to fulfill one of the following purposes: establish RRC connection (to go from RRC_IDLE to RRC_CONNECTED), re-establish RRC connection after radio link failure (RLF), on-demand system information (SI) request, UL synchronization, scheduling request (SR), positioning, link recovery—also known as beam failure recovery (BFR). Physical random access procedure is triggered upon request of a PRACH transmission by higher layers or by a PDCCH order. RA can operate in two modes: (i) contention-based random access (CBRA) where UEs within a serving cell can share same RA resources and there is therefore a possibility of collision among RA attempts from different UEs, and (ii) contention-free random access (CFRA) where a UE has dedicated RA resources that are indicated by a serving gNB and may not be shared with other UEs so that RA collisions can be avoided.

A 4-step random access procedure, also known as a Type-1 L1 random access procedure includes step-1: a UE transmission of a physical random access channel (PRACH) preamble (Msg1); step-2: a gNB transmission of random access response (RAR) message with a PDCCH/PDSCH (Msg2); step-3: UE transmission of a contention resolution message and when applicable, the transmission of a PUSCH scheduled by a RAR UL grant (Msg3); and step-4: gNB transmission of a contention resolution message (Msg4).

In one example of Step-1, prior to initiation of the physical random access procedure, Layer 1 receives from higher layers a set of SS/PBCH block indexes and provides to higher layers a corresponding set of RSRP measurements. Layer 1 receives the configuration of PRACH transmission parameters (PRACH preamble format, time resources, and frequency resources for PRACH transmission). In step-1, UE transmits a PRACH using the selected PRACH format with the transmission power determined depending on whether the PRACH transmission is triggered upon request by higher layers or is in response to a detection of a PDCCH order by the UE and depending on the action associated with the PDCCH order.

In one example of Step-2, random access response (RAR or Msg2) in step-2 is a PDCCH/PDSCH transmission that the UE receives on a DL BWP of a SpCell: the initial DL BWP of the PCell/SpCell for the case of initial access, i.e., (re-)establishing RRC connection, or the active DL BWP (with the same BWP-index as the active UL BWP) of an SpCell for other random access triggers except for initial access. If the active DL BWP index (of the SpCell) is not equal to active UL BWP index (of the serving cell), then switch the active DL BWP to one with the same BWP index. The SCS for PDCCH in RAR message is the SCS for Type1-PDCCH common search space (CSS) set. The SCS for any future PDSCH is also the same SCS as that for PDSCH in RAR, unless the UE is configured an SCS. The PDCCH for RAR is a DCI format 1_0 that the UE monitors, during a certain configured time window, in Type1-PDCCH CSS set of the SpCell identified by the RA-RNTI or, for the case of BFR with CFRA, in the search space indicated by recoverySearchSpaceId of the SpCell identified by the C-RNTI. The PDSCH part of RAR contains the gNB response.

For the case of CFRA-based BFR, receiving a PDCCH during the time window and in the indicated search space of SpCell and addressed correctly to the C-RNTI is sufficient to consider RAR to be successful. For other cases (such as CBRA and SI request), RAR is successful if (i) a PDCCH in the Type1-PDCCH CSS set of the SpCell is received during the configured time window and is addressed to the RA-RNTI; and (ii) the corresponding PDSCH is correctly decoded; and (iii) the MAC RAR contained in PDSCH part of RAR contains a random access preamble ID (RAPID); and (iv) the RAPID in MAC RAR matches the preamble selected and transmitted by the UE in Msg1. Then, the UE, for the serving cell where PRACH preamble/Msg1 was transmitted, applies the TA to adjust/correct the timing between UE and gNB, stores TC-RNTI for use in future transmission, and processes the RAR UL grant to transmit Msg3. If RAR is not successful, the UE attempts a new PRACH preamble transmission, with PRACH resource selection possibly including a different SSB and/or a different preamble and possibly applying PRACH preamble power ramping, unless the UE has already reached a configured maximum number of PRACH attempts, in which case the procedure stops.

In one example of Step-3/4—For the case of CFRA or SI request, a correct reception of Msg2/RAR is the last step for the random access procedure. For the case of CBRA, multiple UEs may have used the same preamble, and further steps are needed to resolve the contention. Furthermore, for the case of random access before RRC_CONNECTED state (i.e., for initial access), UE and gNB need to exchange further information to set up the connection: an uplink PUSCH transmission (Msg3) for contention resolution request and possibly also for connection setup request, and a downlink transmission (Msg4) for contention resolution response and possibly for connection setup response. The contention resolution (and connection set up, if applicable) is considered successful if the UE receives Msg4 within a certain time window after transmission of Msg3 and, for the case that the UE does not have a C-RNTI yet, if the contention resolution ID in Msg4 matches the ID that the UE transmitted in Msg3. Otherwise, the RACH attempt is considered unsuccessful and the UE needs to make another RACH attempt, unless the configured maximum number of RACH attempts have been already exhausted, in which case the entire random access procedure is declared as unsuccessful.

In one example, A 2-step random access procedure, also known as Type-2 L1 random access procedure, includes the transmission of random access preamble in a PRACH and of a PUSCH (MsgA) and the reception of a RAR message with a PDCCH/PDSCH (MsgB), and when applicable, the transmission of a PUSCH scheduled by a RAR UL grant, and PDSCH for contention resolution.

This disclosure relates generally to the operations of a type or group of UEs in networks with the ability to support multiple service types requiring different requirements for data and control information, and multiple UE types with different capabilities. Specifically, it relates to the determination of the uplink carrier for random access and reception of the random access response by a UE belonging to a type or group of UEs that have specific characteristics related to cost, complexity, bandwidth, number of Rx and/or Tx RF chains, power class, power consumption, coverage, mobility, etc. The disclosure also relates to networks operating with multiple uplink and supplementary uplink carriers. The disclosure also relates to determining an uplink carrier to initiate a RA procedure from an indication in a Msg2 or Msg4 or MsgB, and/or in the SIB. The disclosure also relates to determining a BWP to initiate a RA procedure from an indication in a Msg2 or Msg4 or MsgB, and/or in the SIB.

In one embodiment, a determination by the UE of the uplink carrier for a PRACH transmission is provided.

A RedCap UE is capable of operating the uplink in either the SUL carrier or the normal UL carrier in an SUL cell. The UE in IDLE mode selects which uplink carrier to use for random access based on a threshold, rsrp-ThresholdSSB-SUL-RedCap, which is broadcasted in the SUL cell. Other types of UEs configured with the same cell, e.g., Rel-15 eMBB UEs, receive the threshold rsrp-ThresholdSSB-SUL and select the uplink carrier to initiate the random access.

A RedCap UE is configured with a cell with multiple uplink carriers and is capable of operating the uplink in any of the UL carriers. The UE in IDLE mode selects which uplink carrier to use for random access based on a threshold, rsrp-ThresholdSSB-RedCap, which is broadcasted in the cell. Other types of UEs configured with the same cell, e.g., Rel-15 eMBB UEs, receive the threshold rsrp-ThresholdSSB and select the uplink carrier to initiate the random access.

The RSRP thresholds for uplink carrier determination for different types of UEs are different because the bandwidth/latency/data rate requirements are different for different types of UEs, and from a scheduling perspective, different threshold values for UL carrier determination allow a certain type of traffic and/or certain load in an UL carrier.

The rsrp-ThresholdSSB-SUL-RedCap is one of the fields of the RACH-ConfigCommon IE which is used to specify the cell-specific random access parameters. TABLE 1 shows RACH-ConfigCommon IE.

TABLE 1

| RACH-ConfigCommon IE |
| --- |
| RACH-ConfigCommon ::= SEQUENCE { |
| ----- |
| rsrp-ThresholdSSB          RSRP-Range OPTIONAL, -- Need R |
| rsrp-ThresholdSSB-SUL          RSRP-Range OPTIONAL, -- Cond SUL |
| rsrp-ThresholdSSB-SUL-RedCap   RSRP-Range OPTIONAL, -- Cond SUL |
| ----- |
| } |
| RACH-ConfigCommon ::= SEQUENCE { |
| ----- |
| rsrp-ThresholdSSB          RSRP-Range OPTIONAL, -- Need R |
| rsrp-ThresholdSSB-SUL          RSRP-Range OPTIONAL, -- Cond SUL |
| rsrp-ThresholdSSB-RedCap       RSRP-Range OPTIONAL, -- Cond SUL |
| ----- |
| } |

The description of the rsrp-ThresholdSSB-SUL-RedCap (or rsrp-ThresholdSSB-RedCap) is: The UE selects SUL (UL) carrier to perform random access based on this threshold (see TS 38.321 [3], clause 5.1.1). The value applies to all UEs identified as RedCap UEs, and to all the BWPs.

The label "RedCap" used in the RRC parameter name is an example to indicate a characteristic of the UE. Different labels can be used to indicate different characteristics of a UE.

Figure 6:
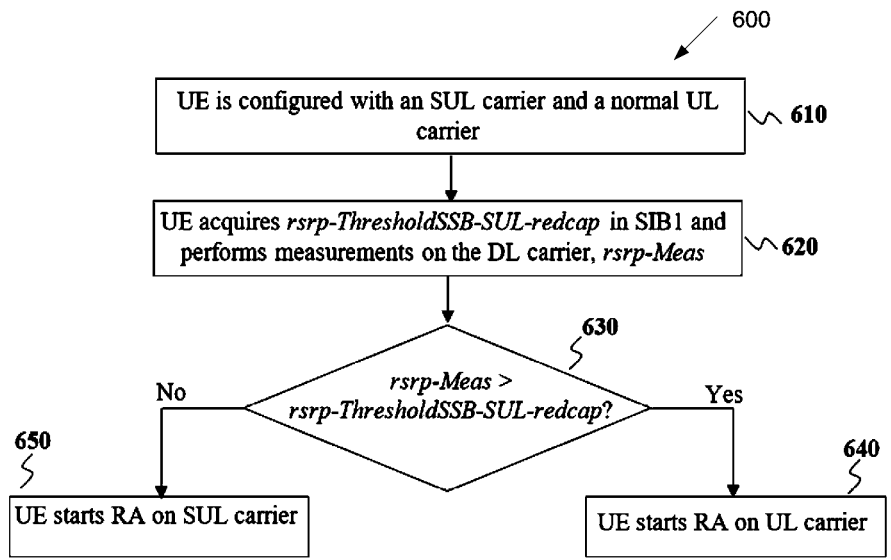
FIG. 6 illustrates a flowchart of a method of UE for determining the uplink carrier for a PRACH transmission according to embodiments of the present disclosure.

FIG. 6 illustrate a flowchart of a method 600 of UE for determining the uplink carrier for a PRACH transmission according to embodiments of the present disclosure. For example, the method 600 may be implemented by a UE such as UE 116 in FIG. 1. An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, a UE is configured with an SUL carrier and a normal UL carrier at step 610. The UE acquires the value of the threshold in the SIB and performs measurements on the DL carrier at step 620. The UE determines whether the measured RSRP is above the threshold at step 630. When the UE determines that the measured RSRP is above the threshold, the UE starts the random access procedure by sending PRACH on the UL carrier at step 640. Otherwise, the UE starts the random access procedure by sending PRACH on the SUL carrier at step 650.

The rsrp-ThresholdSSB-SUL-RedCap value determines if none/some/all UEs perform the random access on a supplementary or normal UL carrier in an SUL cell, or on one of the carriers in a cell. In case the threshold is set to zero, all RedCap UEs perform random access on the normal UL carrier. If the threshold is set to a very high value or infinity, all RedCap UEs perform random access on the SUL carrier. In both cases all RedCap UEs are scheduled either on the SUL carrier or on the normal UL carrier, with the advantage of having the same type of devices/traffic in a carrier. When the traffic generated by RedCap UEs is mostly in uplink, a dedicated uplink carrier to support such traffic is advantageous to minimize the impact in the uplink to other types of traffic or to existing deployments. Only operations in the DL carrier are affected by the presence of RedCap UEs that is shared by RedCap UEs and other types of UEs.

In one embodiment, a detection by a UE of a RAR in a cell is provided.

The RAR from the network is sent on the DL carrier which can be shared by different types of UEs. The RAR message will be sent on the shared DL data channel when the network detects attempts from one or more UEs. When configured with multiple uplink carriers, a UE transmits a PRACH in one of the uplink carriers. In an SUL cell, a UE transmits a PRACH either in the SUL or in the normal UL carrier. In response to a PRACH transmission, a UE attempts to detect a DCI format 1_0 with CRC scrambled by a corresponding RA-RNTI during a window controlled by higher layers. A type of UEs attempts to detect the DCI format 1_0 with CRC scrambled by a corresponding RA-RNTI associated with the UE type, with different types of UEs having a corresponding different RA-RNTI. As an example, in a cell RedCap UEs attempt to detect a DCI scrambled by RA-RedCap-RNTI, and Rel-15/16 UEs attempt to detect a DCI format scrambled by RA-RNTI.

In one embodiment, a determination by a UE of starting a random access procedure from a detected Msg2 is provided.

In response to a PRACH transmission, a UE attempts to detect a DCI format 1_0 with CRC scrambled by a corresponding RA-RNTI during a window controlled by higher layers. If the UE does not detect the DCI format 1_0 with CRC scrambled by the corresponding RA-RNTI within the window, or if the UE does not correctly receive the transport block in the corresponding PDSCH within the window, or if the higher layers do not identify the RAPID associated with the PRACH transmission from the UE, the higher layers can indicate to the physical layer to transmit a PRACH.

According to the described embodiment in the present disclosure, a UE switches uplink carrier for random access faster respect to the existing procedure described above. The UE receives the information to access a different UL carrier in Msg2 and then sends PRACH. This indication to initiate the random access in an uplink carrier (in a different uplink carrier than the carrier used for the last random access attempt, which is configured/signaled to the UE) is in addition to the RSRP threshold method (with rsrp-ThresholdSSB, or rsrp-ThresholdSSB-SUL, or rsrp-ThresholdSSB-SUL-RedCap) which is used for the determination of the uplink carrier for random access in the last attempt, and enables RA attempts in a certain carrier and also data transmission.

For example, in an SUL cell when the threshold value is such that all UEs are allocated to a normal carrier, UEs with poor channel conditions may attempt to access the normal carrier while it would be more efficient to access the SUL carrier (fewer RA attempts, less UE power consumption, less interference, fewer network resources, etc.). The same applies in case multiple UL carriers are configured.

In one embodiment, the indication to initiate the random access procedure on a different uplink carrier is carried by Msg2. A UE detects a DCI format 1_0 with CRC scrambled by a corresponding RA-RNTI, and in response to the Msg2 transmission the UE initiates a random access procedure in a different uplink carrier.

Figure 7:
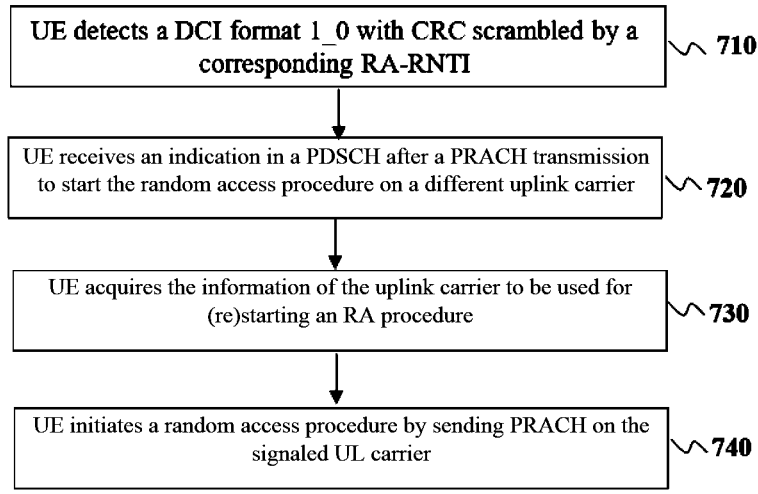
FIG. 7 illustrates a flowchart of a method of UE for starting the random access procedure according to embodiments of the present disclosure.

FIG. 7 illustrate a flowchart of a method 700 for a UE to start the random access procedure according to embodiments of the present disclosure. For example, the method 700 can be implemented by a UE such as UE 116 in FIG. 1. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

In response to a PRACH transmission, a UE detects a DCI format 1_0 with CRC scrambled by a corresponding RA-RNTI at step 710. The UE receives an indication in a PDSCH after a PRACH transmission, such as a Msg2 PDSCH, to start the random access procedure on a different uplink carrier at step 720. The UE acquires the information of the uplink carrier to be used for (re)starting an RA procedure at step 730. The UE initiates a random access procedure by sending PRACH on the signaled UL carrier at step 740.

In one embodiment, the indication for a UE to initiate a new random access procedure on a different uplink carrier is carried in the DCI format 1_0 scrambled by RA-RNTI.

In one example, 1-bit flag is carried in DCI to differentiate between normal DCI format 1_0 scrambled by RA-RNTI (flag value 0) and an indication to initiate a new random access procedure (flag value 1).

In one example, all fields in the DCI format 1_0 are set to one.

In one example, all fields in the DCI format 1_0 are set to zero.

A UE detects a DCI format 1_0 with CRC scrambled by RA-RNTI and determines that an indication to initiate the random procedure was sent based on the value of the 1-bit flag, or on the value of all fields in DCI. A UE transmits a PRACH on the uplink carrier determined as following examples.

In one example, if a UE is in an SUL cell with one SUL carrier and one normal UL carrier, and UE is capable of operating the uplink in either of the two UL carriers of the SUL cell, the UE transmits PRACH in a different carrier than what used in the previous random access attempt for which UE receives the RAR.

In another example, a UE is in an SUL cell with n>1 SUL carriers and one normal UL carrier, and is capable of operating the uplink in any of the UL carriers of the SUL cell. In such example, if the previous random access attempt was in a normal UL carrier, the UE transmits the new PRACH in one of the SUL carriers. A predefined order of the uplink carriers to be used for subsequent random access attempts is configured. Or a predefined SUL carrier to be used for a new random access attempt is configured. Or the SUL carrier to be used for the new random access attempt is signaled. In such example, if the previous random access attempt was in one of the SUL carriers, a predefined order of the uplink carriers to be used for subsequent random access attempts is configured. Or the SUL carrier to be used for the new random access attempt is signaled.

In yet another example, if a UE is in a cell configured with multiple UL carriers, a predefined order of the uplink carriers to be used for subsequent random access attempts is configured. Or the SUL carrier to be used for the new random access attempt is signaled.

In one embodiment, the indication for a UE to initiate a new random access procedure on a different uplink carrier is carried in a new DCI format x_y.

A UE detects a DCI format x_y with CRC scrambled by RA-RNTI and determines that an indication to initiate the random procedure was sent. A UE transmits a PRACH on the uplink carrier determined as the described embodiment in the present disclosure When a UE transmits a PRACH preamble in an uplink, wherein the uplink carrier can be a normal carrier or an SUL carrier, and receives an indication in RAR to use a different uplink carrier, the UE starts a RA procedure by transmitting a PRACH preamble in a different uplink carrier, wherein the indication of the uplink carrier is in the SIB, or in a DCI format 1_0 with CRC scrambled by a corresponding RA-RNTI, or in a RAR message in PDSCH, or a combination of configuration in the SIB and dynamic signalling. A UE restarts the RA procedure in the indicated carrier by using a 4-step RA or a 2-step RA, wherein the type of RA procedure associated with an uplink carrier can be included in the SIB.

In one example, when the indication to use a different uplink carrier for PRACH transmission is a 1-bit indicator in a DCI format 1_0 with CRC scrambled by an RA-RNTI, or all bits in a DCI format 1_0 with CRC scrambled by a corresponding RA-RNTI are all ones or all zeros, upon reception of such indication in a first carrier, the UE restarts the RA procedure in a second carrier.

In such example, when a gNB configures two uplink carriers, the UE restarts the RA procedure in the other carrier. The two carriers can be normal or SUL carriers.

In such example, when a gNB configures more than two uplink carriers, wherein one carrier is a normal carrier and more than one carrier are SUL carriers: (1) the first carrier can be a normal carrier and the second carrier can be the first SUL carrier as indicated in SIB; (2) the first carrier can be an SUL carrier and the second carrier can be a subsequent SUL carrier according to the order in which SUL carriers are listed in SIB; or (3) the first carrier can be an SUL carrier and the second carrier can be the normal carrier.

In such example, when a gNB configures more than two uplink carriers, wherein more than one carrier is a normal carrier and one carrier is an SUL carrier: (1) the first carrier can be a normal carrier and the second carrier can be the SUL carrier; (2) the first carrier can be a normal carrier and the second carrier can be a subsequent normal carrier according to the order in which normal carriers are listed in SIB; (3) the first carrier can be an SUL carrier and the second carrier can be a normal carrier.

In such example, when a gNB configures more than one normal UL carrier and more than one SUL carrier: (1) the first carrier can be a normal carrier and the second carrier can be a subsequent normal carrier according to the order in which normal carriers are listed in SIB or an SUL carrier (for example the first SUL carrier as listed in SIB); and/or (2) the first carrier can be an SUL carrier and the second carrier can be a subsequent SUL carrier according to the order in which SUL carriers are listed in SIB or a normal carrier (for example the first normal carrier as listed in SIB).

A field in a DCI format 1_0 with CRC scrambled by a RA-RNTI can indicate which carrier to use. For example, if a gNB configures two carriers, a 1-bit indication value "0" can indicate no change in carrier and a value of "1" can indicate to use the other carrier.

If a gNB configures N carriers, a log 2(N)-bits indication can indicate the carrier to use. Alternatively, with a 1-bit indication a value of "1" can indicate to use another carrier to restart a RA procedure, cycling over the N carriers. For example, if a UE uses a first carrier of N carriers to transmit a PRACH and receives a value "1" in the 1-bit indicator, the UE can use a second carrier for the next PRACH transmission; if a UE uses a second carrier of N carriers to transmit PRACH, the UE can use a third carrier for the next PRACH transmission; and so on. It is also possible that a UE can use only some of the configured carriers as signaled in a bitmap in SIB.

For example, if a gNB configures 4 carriers, a bitmap of 4 bits in SIB "1 1 0 1" indicates that first, second and fourth carriers can be used. If a UE transmits a PRACH in a first carrier and receives in RAR an indication to restart the RA procedure in another carrier, the UE restarts the RA procedure by transmitting a PRACH preamble in a second carrier. If a UE transmits a PRACH in a second carrier and receives in RAR an indication to restart the RA procedure in another carrier, the UE restarts the RA procedure by transmitting a PRACH preamble in a fourth carrier.

If both normal and SUL carriers can be used by a UE, a bitmap in SIB indicating which carriers can be used for RA procedure can be used for both types of carriers and the size of the bitmap is equal to the total number of normal and SUL carriers. If two bitmaps, one associated with normal carriers and one associated with SUL carriers, are used, an indication to the UE includes the information of the carrier type. For example, for N1 normal carriers and N2 SUL carriers, 1 bit can be used to indicate which of the two bit mappings to use to determine the uplink carrier: "0" can indicate the bitmap for N1 carriers and "0" indicates the bitmap for N2 carriers.

A UE receiving a value of "1" in a 1-bit indicator in a DCI format 1_0 with CRC scrambled by a RA-RNTI is not expected to receive a RAR message in PDSCH associated with the DCI format 1_0. Alternatively, a UE receiving a value of "1" in a 1-bit indicator can receive a RAR message in PDSCH associated with the DCI format 1_0, wherein the RAR message indicates the uplink carrier to use for the RA procedure.

It is also possible to have a bitmap in the SIB mapping to the carriers indicated in the SIB and the slot number. For example, for 2 carriers, a bitmap of 10 bits can indicate use of "0 1 0 0 0 1 1 0 0 0" carrier for the 10 slots of a frame. For N carriers, a bitmap includes log 2(N) bits for each bitmap entry. Such bitmap can have a periodicity of a number of slots, or a number of frames. The granularity of such mapping can be a slot or a number of slots or a frame. Such bitmap can be used by the UE when determining the uplink carrier for RA, either for a first PRACH transmission or for a PRACH transmission to restart the RA procedure in another carrier.

Figure 8:
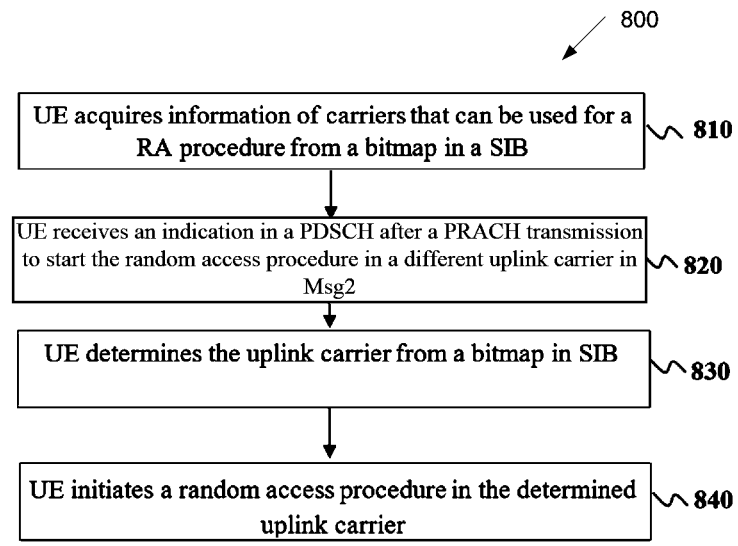
FIG. 8 illustrates another flowchart of a method of UE for starting the random access procedure according to embodiments of the present disclosure.

FIG. 8 illustrates another flowchart of a method 800 of UE for a UE to start a random access procedure according to embodiments of the present disclosure. For example, the method 800 can be implemented by a UE, such as UE 116 in FIG. 1, to start the random access procedure in another uplink carrier after receiving a Msg2 PDSCH in a current carrier. An embodiment of the Msg2 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

A UE acquires information of carriers that can be used for a RA procedure from a bitmap in a SIB at step 810. The UE receives an indication in a PDSCH after a PRACH transmission, such as a Msg2 PDSCH, to start the random access procedure in a different uplink carrier in Msg2 at step 820. The UE determines the uplink carrier from a bitmap in SIB at step 830, wherein the bitmap indicates one or more carriers that can be used for (re)starting an RA procedure at a certain time instant such as a slot. The UE initiates a random access procedure in the determined uplink carrier at step 840.

It is also possible that there is a need for a gNB to indicate to a UE to use a different carrier in Msg4. A UE then receives an indication to use a different uplink carrier than the one used to transmit PRACH and Msg3 after transmitting Msg3 and start a RA procedure by transmitting a PRACH preamble in the indicated uplink carrier, wherein the indication of the uplink carrier comprises an indication in the SIB, or in a DCI format 1_0 with CRC scrambled by a corresponding TC-RNTI scheduling a PDSCH, or in a PDSCH, or a combination of configuration in the SIB and dynamic signalling. Details of the indication in SIB, in PDCCH and in PDSCH described above for signalling in RAR apply also to signalling in Msg4. A UE restarts the RA procedure in the indicated carrier by using a 4-step RA or a 2-step RA, wherein the type of RA procedure associated with an uplink carrier can be included in the SIB.

Figure 9:
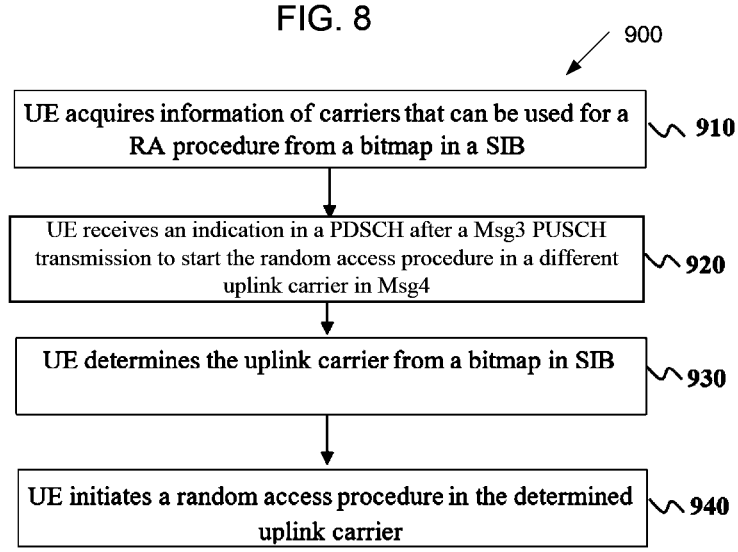
FIG. 9 illustrates yet another flowchart of a method of UE for starting the random access procedure according to embodiments of the present disclosure.

FIG. 9 illustrates yet another flowchart of a method 900 for a UE to start a random access procedure according to embodiments of the present disclosure. For example, the method 900 can be implemented by a UE, such as UE 116 in FIG. 1, to start the random access procedure in another uplink career after receiving a Msg4 PDSCH in a current carrier. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

A UE acquires information of carriers that can be used for RA procedure from a bitmap in a SIB at step 910. A UE receives an indication in a PDSCH after a Msg3 PUSCH transmission, such as a Msg4 PDSCH, to start the random access procedure in a different uplink carrier in Msg4 at step 920. The UE determines the uplink carrier from a bitmap in SIB at step 930, wherein the bitmap indicates one or more carriers that can be used for (re)starting an RA procedure at a certain time instant such as a slot. The UE initiates a random access procedure in the determined uplink carrier at step 940.

A gNB can indicate to a UE to start the RA procedure in another carrier during a 2-step RA procedure. In response to a transmission of a MsgA that includes a PRACH preamble and a PUSCH, a UE receives a MsgB that includes an indication to start a new RA procedure in a different carrier, wherein the indication of the uplink carrier comprises an indication in the SIB, or in a DCI format 1_0 with CRC scrambled by a corresponding MsgB-RNTI scheduling a PDSCH, or in a PDSCH, or a combination of configuration in the SIB and dynamic signalling. Details of the indication in SIB, in PDCCH and in PDSCH described above for signalling in Msg2 for a 4-step RA procedure also apply to signalling in MsgB for a 2-step RA procedure. The UE restarts the RA procedure in the indicated carrier by using a 4-step RA or a 2-step RA, wherein the type of RA procedure associated with an uplink carrier can be included in the SIB.

Figure 10:
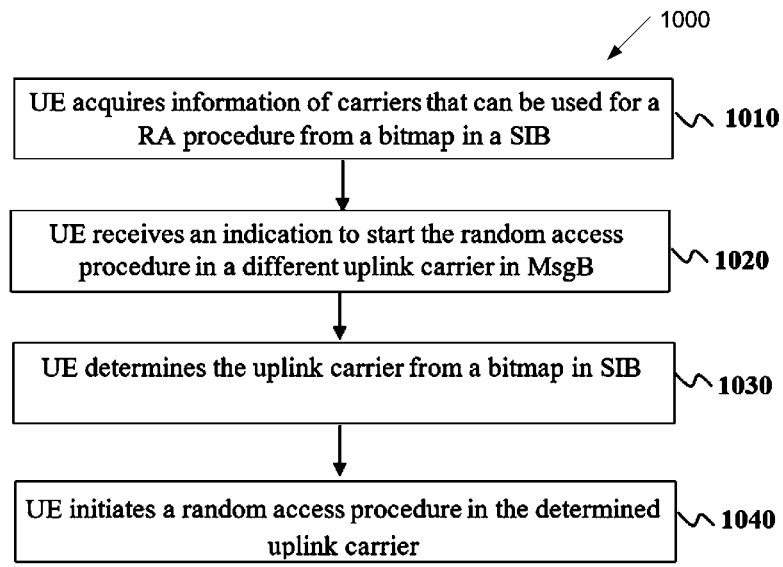
FIG. 10 illustrates yet another flowchart of a method of UE for starting the random access procedure according to embodiments of the present disclosure.

FIG. 10 illustrates yet another flowchart of a method 1000 for a UE to start the random access procedure according to embodiments of the present disclosure. For example, the method 1000 can be implemented by a UE, such as UE 116 in FIG. 1, to start the random access procedure in another uplink carrier after receiving a MsgB PDSCH in a current carrier. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

A UE acquires information of carriers that can be used for an RA procedure from a bitmap in a SIB at step 1010. The UE receives the indication to start the random access procedure in a different uplink carrier in MsgB at step 1020. The UE determines the uplink carrier from a bitmap in SIB at step 1030, wherein the bitmap indicates one or more carriers that can be used for restarting the RA procedure at a certain time instant such as a slot. The UE initiates a random access procedure in the determined uplink carrier at step 1040.

When a UE transmits a PRACH preamble in an uplink carrier of a BWP, the UE can receive an indication to use a different BWP to start a RA procedure, wherein the indication of the BWP can be in a DCI format 1_0 with CRC scrambled by a corresponding RA-RNTI, or in a RAR message in PDSCH, or a combination of configuration in the SIB and dynamic signalling. For a UE using a 2-step RA procedure, the indication of a different BWP can be included in a MsgB received in response to a MsgA transmission by the UE. A UE restarts the RA procedure in the indicated BWP by using a 4-step RA or a 2-step RA, wherein the type of RA procedure associated with a BWP can be included in the SIB.

A gNB can configure in a SIB multiple UL BWPs, wherein a first UL BWP is the UL BWP corresponding to the DL BWP where the SIB is received, and one or more UL BWPs are configured as secondary UL BWPs. The first UL BWP can be larger of any of the secondary UL BWPs and some or all of the secondary UL BWPs may be included in the first BWP. For example, a first BWP is 100 MHz, and there are four configured secondary BWPs of 20 MHz bandwidth that are included in the first UL BWP. It is also possible that the first BWP is smaller than a secondary UL BWP, and overlaps entirely or partially with the secondary BWP. It is also possible that the first UL BWP does not overlap with a secondary UL BWP. The first BWP can be also smaller than any of the secondary BWPs. The configured first UL BWP and at least one of the secondary UL BWPs can have the same bandwidth. The first UL BWP can overlap with some of the secondary BWPs. Alternatively, the first UL BWP does not overlap with any of the secondary BWPs. The secondary UL BWPs can have same or different bandwidths.

When the indication to use a different uplink BWP for PRACH transmission is a 1-bit indicator in a DCI format 1_0 with CRC scrambled by an RA-RNTI, or all bits in a DCI format 1_0 with CRC scrambled by a corresponding RA-RNTI are all ones or all zeros, upon reception of such indication in a first BWP, the UE restarts the RA procedure in a second BWP, wherein: (1) when a gNB configures two BWPs, the UE restarts the RA procedure in the other BWP;

and/or (2) when a gNB configures more than two BWPs, the second BWP can be a subsequent BWP according to the order in which BWPs are listed in SIB.

A field in a DCI format 1_0 with CRC scrambled by a RA-RNTI can indicate which BWP to use. For example, if a gNB configures two BWPs, a 1-bit indication value "0" can indicate no change in BWP and a value of "1" can indicate to use the other BWP.

If a gNB configures N BWPs, a log 2(N)-bits indication can indicate the BWP to use. Alternatively, with a 1-bit indication a value of "1" can indicate to use another BWP to restart a RA procedure, cycling over the N BWPs. For example, if a UE uses a first BWP of N BWPs to transmit a PRACH and receives a value "1" in the 1-bit indicator, the UE can use a second BWP for the next PRACH transmission; if a UE uses a second BWP of N BWPs to transmit PRACH, the UE can use a third BWP for the next PRACH transmission; and so on. It is also possible that a UE can use only some of the configured BWPs as signaled in a bitmap in SIB.

For example, if a gNB configures 4 BWPs, a bitmap of 4 bits in SIB "1 1 0 1" indicates that first, second and fourth BWPs can be used. If a UE transmits a PRACH in a first BWP and receives in RAR an indication to restart the RA procedure in another BWP, the UE restarts the RA procedure by transmitting a PRACH preamble in a second BWP. If a UE transmits a PRACH in a second BWP and receives in RAR an indication to restart the RA procedure in another BWP, the UE restarts the RA procedure by transmitting a PRACH preamble in a fourth BWP.

A UE receiving a value of "1" in a 1-bit indicator of a BWP in a DCI format 1_0 with CRC scrambled by a RA-RNTI is not expected to receive a RAR message in PDSCH associated with the DCI format 1_0. Alternatively, a UE receiving a value of "1" in a 1-bit indicator of a BWP can receive a RAR message in PDSCH associated with the DCI format 1_0, wherein the RAR message indicates the uplink BWP to use for the RA procedure.

It is also possible to have a bitmap in the SIB mapping to the BWPs indicated in the SIB and the slot number. For example, for 2 BWPs, a bitmap of 10 bits can indicate use of "0 1 0 0 0 1 1 0 0 0" BWP for the 10 slots of a frame. For N BWPs, a bitmap includes log 2(N) bits for each bitmap entry. Such bitmap can have a periodicity of a number of slots, or a number of frames. The granularity of such mapping can be a slot or a number of slots or a frame. Such bitmap can be used by the UE when determining the uplink BWP for RA, either for a first PRACH transmission or for a PRACH transmission to restart the RA procedure in another BWP.

Figure 11:
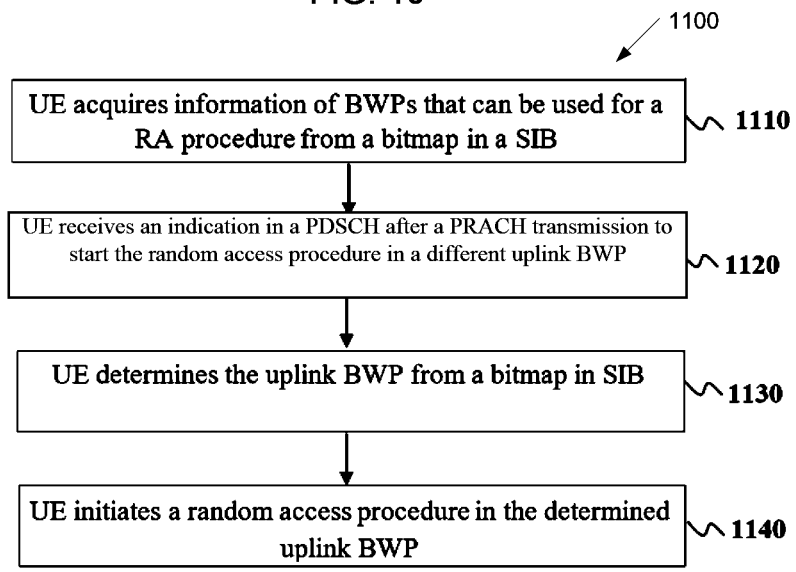
FIG. 11 illustrates yet another flowchart of a method of UE for starting the random access procedure according to embodiments of the present disclosure.

FIG. 11 illustrates yet another flowchart of a method 1100 for a UE to start the random access procedure according to embodiments of the present disclosure. For example, the method 1100 can be implemented by a UE, such as UE 116 in FIG. 1, to start the random access procedure in another uplink BWP after receiving a Msg2 PDSCH in a current BWP. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

A UE acquires information of BWPs that can be used for RA procedure from a bitmap in a SIB at step 1110. The UE receives an indication in a PDSCH after a PRACH transmission, such as a Msg2 PDSCH, to start the random access procedure in a different uplink BWP at step 1120. The UE determines the uplink BWP from a bitmap in SIB at step 1130, wherein the bitmap indicates one or more BWPs that can be used for (re)starting an RA procedure at a certain time instant such as a slot. The UE initiates a random access procedure in the determined uplink BWP at step 1140.

It is also possible that there is a need for a gNB to indicate to a UE to use a different BWP in Msg4. A UE then receives an indication to use a different uplink BWP than the one used to transmit PRACH and Msg3 after transmitting Msg3 and start a RA procedure by transmitting a PRACH preamble in the indicated uplink BWP, wherein the indication of the uplink BWP comprises an indication in the SIB, or in a DCI format 1_0 with CRC scrambled by a corresponding TC-RNTI scheduling a PDSCH, or in a PDSCH, or a combination of configuration in the SIB and dynamic signalling. Details of the indication in SIB, in PDCCH and in PDSCH described above for signalling in RAR apply also to signalling in Msg4. A UE restarts the RA procedure in the indicated BWP by using a 4-step RA or a 2-step RA, wherein the type of RA procedure associated with an uplink BWP can be included in the SIB.

Figure 12:
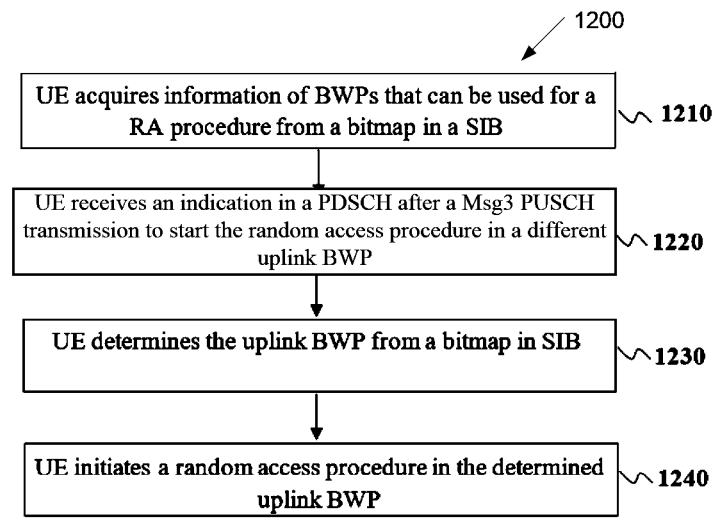
FIG. 12 illustrates yet another flowchart of a method for a UE to start a random access procedure according to embodiments of the present disclosure.

FIG. 12 illustrates yet another flowchart of a method 1200 for a UE to start a random access procedure according to embodiments of the present disclosure. For example, the method 1000 can be implemented by a UE, such as UE 116 in FIG. 1, to start the random access procedure in another BWP after receiving a Msg4 PDSCH in a current BWP, An embodiment of the method 1000 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

A UE acquires information of BWPs that can be used for RA procedure from a bitmap in a SIB at step 1210. The UE receives an indication in a PDSCH after a Msg3 PUSCH transmission, such as a Msg4 PDSCH, to start the random access procedure in a different uplink BWP at step 1220. The UE determines the uplink BWP from a bitmap in SIB at step 1230, wherein the bitmap indicates one or more BWPs that can be used for (re)starting an RA procedure at a certain time instant such as a slot. The UE initiates a random access procedure in the determined uplink BWP at step 1240.

A gNB can indicate to a UE to start the RA procedure in another BWP during a 2-step RA procedure. In response to a transmission of a MsgA that includes a PRACH preamble and a PUSCH, a UE receives a MsgB that includes an indication to start a new RA procedure in a different BWP, wherein the indication of the uplink BWP comprises an indication in the SIB, or in a DCI format 1_0 with CRC scrambled by a corresponding MsgB-RNTI scheduling a PDSCH, or in a PDSCH, or a combination of configuration in the SIB and dynamic signalling. Details of the indication in SIB, in PDCCH and in PDSCH described above for signalling in Msg2 for a 4-step RA procedure also apply to signalling in MsgB for a 2-step RA procedure. The UE restarts the RA procedure in the indicated BWP by using a 4-step RA or a 2-step RA, wherein the type of RA procedure associated with an uplink BWP can be included in the SIB.

Figure 13:
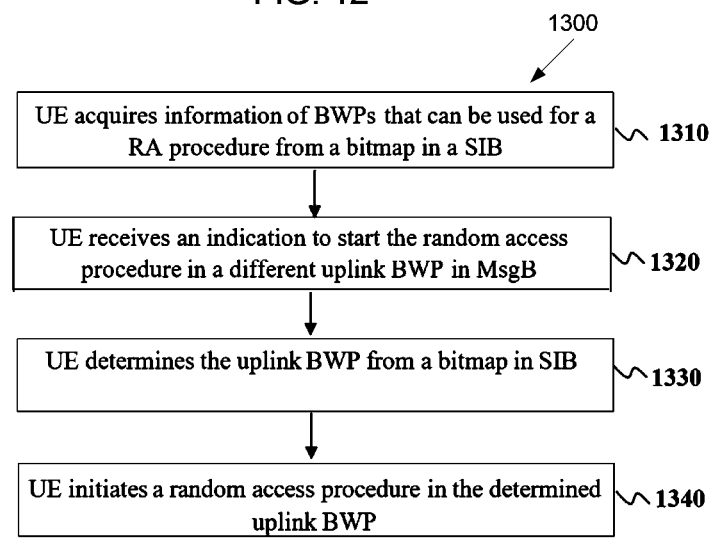
FIG. 13 illustrates yet another flowchart of a method for a UE to start a random access procedure according to embodiments of the present disclosure.

FIG. 13 illustrates yet another flowchart of a method 1300 for a UE to start a random access procedure according to embodiments of the present disclosure. For example, the method 1300 can be implemented by a UE, such as UE 116 in FIG. 1, to start the random access procedure in another uplink BWP after receiving a MsgB PDSCH in a current BWP. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

A UE acquires information of BWPs that can be used for an RA procedure from a bitmap in a SIB at step 1310. The UE receives the indication to start a random access procedure in a different uplink BWP in MsgB at step 1320. The UE determines the uplink BWP from a bitmap in SIB at step 1330, wherein the bitmap indicates one or more BWPs that can be used for restarting the RA procedure at a certain time instant such as a slot. The UE initiates a random access procedure in the determined uplink BWP at step 1340.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a communication system, the UE comprising:
   a transceiver configured to receive, from a base station, a system information block (SIB) including first information associated with a first uplink (UL) frequency resource for one or more UEs in a cell and second information associated with a second UL frequency resource for one or more reduced capability (RedCap) UEs in the cell, wherein:
   the first information includes first random access information for the one or more UEs in the cell, and
   the second information includes second random access information for the one or more RedCap UEs in the cell; and
   a processor operably coupled to the transceiver, the processor configured to:
   in case that the UE is a RedCap UE, identify a reference signal received power (RSRP) threshold for selection between a normal UL (NUL) carrier and a supplementary UL (SUL) carrier included in the second random access information,
   identify an UL carrier for a random access among the NUL carrier and the SUL carrier based on the RSRP threshold, and
   perform the random access with the base station on the identified UL carrier based on the second random access information.

2. The UE of claim 1, wherein:
   the processor is configured to select the UL carrier based on a bit-map and number of a time unit for transmission of a physical random access channel (PRACH) for the random access,
   the SIB indicates the bit-map, and
   the bit-map maps UL carriers to time units for the PRACH transmission.

3. The UE of claim 1, wherein the processor is further configured to:
   if an RSRP of a downlink pathloss reference is less than the RSRP threshold, select the SUL carrier for the random access, and
   if the RSRP of the downlink pathloss reference is greater than or equal to the RSRP threshold, select the NUL carrier for the random access.

4. The UE of claim 1, wherein:
   the first UL frequency resource includes a first UL bandwidth part (BWP) for the one or more UEs, and
   the second UL frequency resource includes a second UL BWP for the one or more RedCap UEs.

5. The UE of claim 4, wherein:
   the processor is configured to perform the random access with the base station based on the second UL BWP,
   the random access is based on a type of the random access including a 4-step random access or a 2-step random access, and
   the type of the random access is identified based on the SIB.

6. The UE of claim 1, wherein:
   the SIB includes an indication for a second number of repetitions for transmission of a physical random access channel (PRACH) for the random access on the SUL carrier, and
   the second number of repetitions is larger than a first number of repetitions for the PRACH transmission on the NUL carrier.

7. The UE of claim 1, wherein:
   transmission of a physical random access channel (PRACH) for the random access on the NUL carrier is based on a sequence from a set of sequences,
   the PRACH transmission on the SUL carrier is based on a sequence from a subset of sequences of the set of sequences, and
   the subset of sequences does not include sequences with a smallest length from the set of sequences.

8. A base station (BS) comprising:
   a transceiver configured to transmit a system information block (SIB) including first information associated with a first uplink (UL) frequency resource for one or more user equipments (UEs) in a cell and second information associated with a second UL frequency resource for one or more reduced capability (RedCap) UE in the cell, wherein:
   the first information includes first random access information for the one or more UEs in the cell,
   the second information includes second random access information for the one or more RedCap UEs in the cell, and
   the second random access information includes a reference signal received power (RSRP) threshold for selection of a UL carrier between a normal UL (NUL) carrier and a supplementary UL (SUL) carrier; and
   a processor operably coupled to the transceiver, the processor configured to perform, based on the second random access information, a random access with a RedCap UE on the UL carrier.

9. The BS of claim 8, wherein:
   the processor is configured to determine the UL carrier based on a bit-map and number of a time unit for reception of a physical random access channel (PRACH) for the random access,
the SIB indicates the bit-map, and
the bit-map maps UL carriers to time units for the PRACH reception.

10. The BS of claim 8, wherein:
the SUL carrier is used for the random access if an RSRP of a downlink pathloss reference is less than the RSRP threshold, and
the NUL carrier is used for the random access if the RSRP of the downlink pathloss reference is greater than or equal to the RSRP threshold.

11. The BS of claim 8, wherein:
the first UL frequency resource includes a first UL bandwidth part (BWP) for the one or more UEs, and
the second UL frequency resource includes a second UL BWP for the one or more RedCap UEs.

12. The BS of claim 11, wherein:
the random access is performed based on the second UL BWP,
the random access is based on a type of the random access including a 4-step random access or a 2-step random access, and
the type of the random access is identified based on the SIB.

13. The BS of claim 8, wherein:
the SIB includes an indication for a second number of repetitions for reception of a physical random access channel (PRACH) for the random access on the SUL carrier,
the second number of repetitions is larger than a first number of repetitions for the PRACH reception on the NUL carrier,
the PRACH reception on the NUL carrier is based on a sequence from a set of sequences,
the PRACH reception on the SUL carrier is based on a sequence from a subset of sequences of the set of sequences, and
the subset of sequences does not include sequences with a smallest length from the set of sequences.

14. A method for operating a user equipment (UE) in a communication system, the method comprising:
receiving, from a base station, a system information block (SIB) including first information associated with a first uplink (UL) frequency resource for one or more UEs in a cell and second information associated with a second UL frequency resource for one or more reduced capability (RedCap) UEs in the cell, wherein:
the first information includes first random access information for the one or more UEs in the cell, and
the second information includes second random access information for the one or more RedCap UEs in the cell;
in case that the UE is a RedCap UE, identifying a reference signal received power (RSRP) threshold for selection between a normal UL (NUL) carrier and a supplementary UL (SUL) carrier included in the second random access information,
identifying an UL carrier for a random access among the NUL carrier and the SUL carrier based on the RSRP threshold, and
performing the random access with the base station on the identified UL carrier based on the second random access information.

15. The method of claim 14, further comprising:
selecting the UL carrier based on a bit-map and number of a time unit for transmission of a physical random access channel (PRACH) for the random access, wherein
the SIB indicates the bit-map, and
the bit-map maps UL carriers to time units for the PRACH transmission.

16. The method of claim 14, wherein identifying the UL carrier for the random access comprises:
when an RSRP of a downlink pathloss reference is less than the RSRP threshold, selecting the SUL carrier for the random access, and
when the RSRP of the downlink pathloss reference is greater than or equal to the RSRP threshold, selecting the NUL carrier for the random access.

17. The method of claim 14, wherein:
the first UL frequency resource includes a first UL bandwidth part (BWP) for the one or more UEs, and
the second UL frequency resource includes a second UL BWP for the one or more RedCap UEs.

18. The method of claim 17, wherein:
performing the random access comprises performing the random access with the base station based on the second UL BWP,
the random access is based on a type of the random access including a 4-step random access or a 2-step random access, and
the type of the random access is identified based on the SIB.

19. The method of claim 14, wherein:
the SIB includes an indication for a second number of repetitions for transmission of a physical random access channel (PRACH) for the random access on the SUL carrier, and
the second number of repetitions is larger than a first number of repetitions for the PRACH transmission on the NUL carrier.

20. The method of claim 14, wherein:
transmission of a physical random access channel (PRACH) for the random access on the NUL carrier is based on a sequence from a set of sequences,
the PRACH transmission on the SUL carrier is based on a sequence from a subset of sequences of the set of sequences, and
the subset of sequences does not include sequences with a smallest length from the set of sequences.

* * * * *